United States Patent

[11] 3,632,480

[72] Inventors: Kenneth S. Surprenant, Midland; Raymond T. Gerard, Bay City, both of Mich.
[21] Appl. No.: 56,999
[22] Filed: June 8, 1970
[45] Patented: Jan. 4, 1972
[73] Assignee: The Dow Chemical Company, Midland, Mich.
Original application July 1, 1968, Ser. No. 741,520, now abandoned. Divided and this application June 8, 1970, Ser. No. 56,999

[54] VAPOR DEGREASING APPARATUS WITH FALLING FILM HEAT EXCHANGE SURFACE
2 Claims, 5 Drawing Figs.

[52] U.S. Cl. .................................................. 202/169, 202/170 D, 202/236, 134/105, 134/109
[51] Int. Cl. ........................................................ B01d 3/00
[50] Field of Search ............................................ 202/169, 170 D, 170, 168, 236; 134/10, 11, 12, 105, 107, 108, 109, 31

[56] References Cited
UNITED STATES PATENTS
| | | | |
|---|---|---|---|
| 2,930,349 | 3/1960 | Jones | 202/170 X |
| 2,860,088 | 11/1958 | Plassmeyer | 202/170 |
| 2,310,569 | 2/1943 | Booth | 134/12 |
| 2,162,656 | 6/1939 | Warrington | 134/12 |

Primary Examiner—Norman Yudkoff
Assistant Examiner—David Edwards
Attorneys—Griswold & Burdick, C. E. Rehberg and Glwynn R. Baker ABSTRACT: A method and apparatus for continuously producing solvent vapors and simultaneously purifying the solvent by directing liquid solvent which contains high-boiling impurities onto a gravity flow heat exchange surface thereby to vaporize the low-boiling solvent away from the high-boiling impurities as the solvent flows across the heat exchange surface.

INVENTORS.
Kenneth S. Surprenant
Raymond T. Gerard
BY Glwynn R Baker
ATTORNEY

INVENTORS,
Kenneth S. Surprenant
Raymond T. Gerard
BY Glwynn R Baker
ATTORNEY

PATENTED JAN 4 1972

INVENTORS.
Kenneth S. Surprenant
Raymond T. Gerard
BY
ATTORNEY

VAPOR DEGREASING APPARATUS WITH FALLING FILM HEAT EXCHANGE SURFACE

This is a division of application Ser. No. 741,520, filed 7-1-68, now abandoned.

BACKGROUND OF INVENTION

The art of treating a material by causing the vapor of a solvent to condense on the material until the material's surface at least reaches the solvent vapor temperature is well documented in the literature. The numerous processes and apparatus set forth have not materially changed from those designed many years ago. For instance, the degreasing of metal parts is accomplished by generating vapors of a solvent from a liquid sump, establishing a vapor level by providing condensing means at the desired level, introducing the soiled cold part into the vapors, thereby causing the vapor to condense on the part. The condensate containing the soil falls from the part into the sump. The part is taken from the vapor zone when its surface temperature reaches the solvent vapor temperature. The continued introduction of soil into the sump creates several problems. For example, the soil fouls the heat exchange surface creating sites whereat breakdown of the solvent can and does occur. This problem is partly remedied by periodic distillation of the solvent. Of course, this requires downtime on the degreaser. Further, since the soil is sludgelike in character and sticks to the heat exchange surface, the interior of the degreaser must also be cleaned periodically. These operations are time consuming and uneconomical.

It is an object of the present invention to substantially eliminate these operations of cleaning the degreaser.

It is another object of the present invention to provide a process for simultaneously vaporizing solvent and purifying the solvent.

It is still another object of the present invention to provide apparatus suitable for accomplishing the process of the present invention.

These and other objects will become apparent to those skilled in the art from the following description and claims.

BRIEF DESCRIPTION OF THE INVENTION

The present invention comprises a method whereby a solvent of the class halogenated hydrocarbons having one to three carbon atoms and two to six halogen atoms is vaporized, the vapors are employed to treat a material by condensing on the material, the condensed solvent collected as it runs off the material and condensed solvent transported to the vaporization step whereby high boiling impurities are continuously removed from the process, said vaporization step being conducted by causing a falling film of solvent containing the high boiling impurities to pass over a heat exchange means capable of volatilizing the solvent but not the high boiling impurities.

The present invention also comprises one form of an apparatus for conducting the process of the present invention consisting of a receptacle for holding liquid and vapor, provided with vapor level control means, and a heat exchange surface disposed angularly within said receptacle to receive solvent containing high boiling impurities and to volatilize the solvent and cause the high boiling impurities to move by gravitational force downwardly upon the surface of said heat exchanger and be withdrawn from the unit.

The apparatus in accordance with the present invention are illustrated in the drawings.

Figure 1:
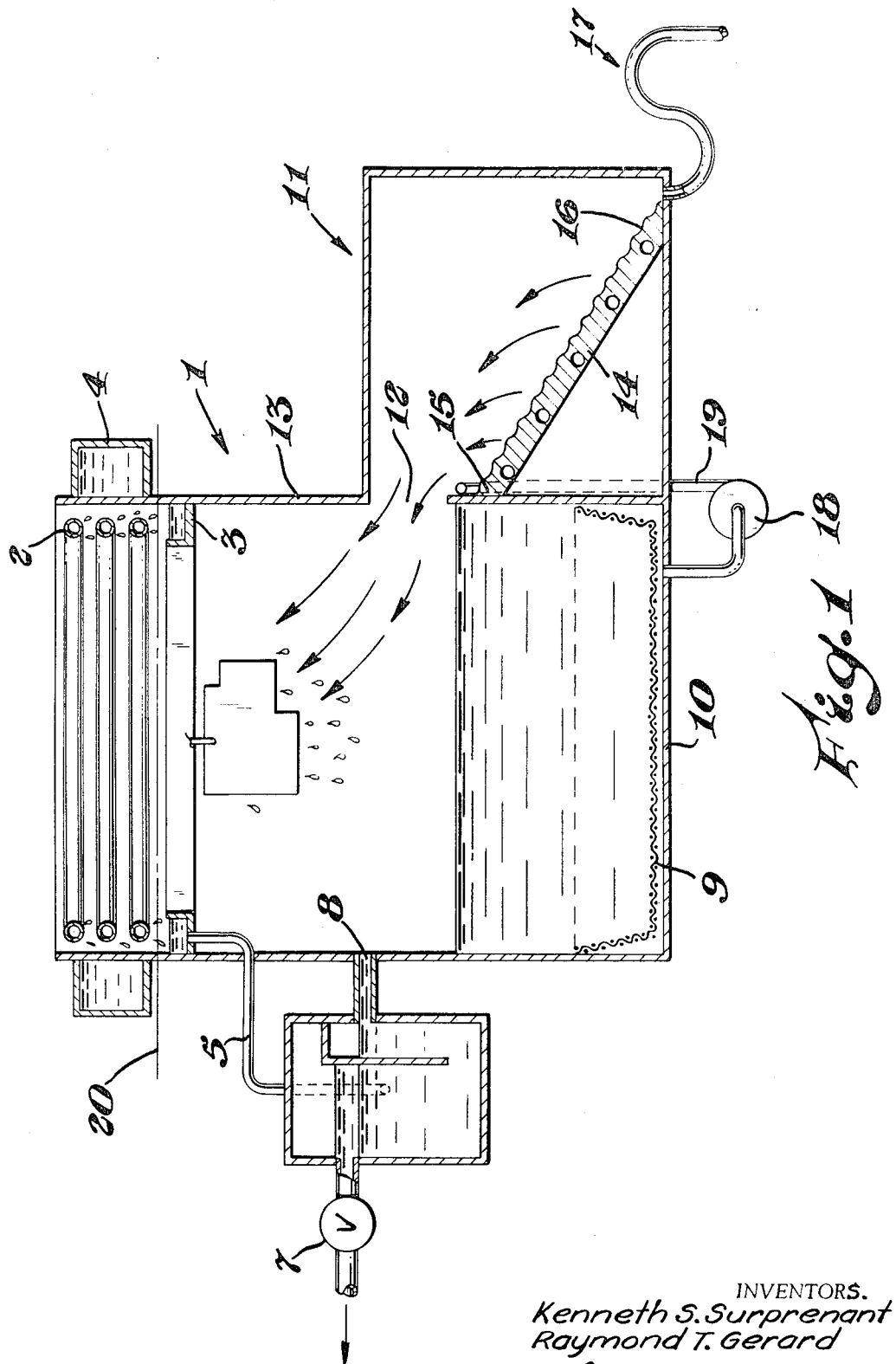
FIG. 1 illustrates a sectional view of an apparatus having the volatilization and purification element integral with one end of the apparatus.

In operation, an apparatus of the present invention, as illustrated in the drawings, is provided with a solvent capable of vaporization and which has a vapor density at least twice greater than air. The solvent is supplied either to the sump or storage. The vapor level control means is activated. A thin layer of solvent is delivered by a pump and piping to the heat exchange surface which is heated with steam, electricity, gas or other means. Solvent is vaporized from the surface of the heat exchanger and fills the heat exchange enclosure, its upper level being established and maintained by the vapor level control means. Solvent vapor in excess of that necessary to fill the receptacle is condensed by the vapor level control means and directed to a water separator whereupon when the solvent level therein reaches the solvent overflow, it is returned to the sump or storage to be recycled to the heat exchange surface. Once this cycle is established, the apparatus is ready to receive material which is to be treated. The cold material is introduced into the vapor zone wherein the solvent vapors condense on its surface, and for example, dissolve grease and oil and wash particulate soil from the surface. When the surface of the material has reached the temperature of the solvent vapors, no further condensation occurs and the material can be withdrawn from the vapor zone into the surrounding atmosphere. Alternatively, the material may be introduced through the vapor zone into a sump of solvent or flushed with a solvent spray for a greater wetting effect, then withdrawn into the vapor zone for further treatment and heating of its surface to the solvent vapor temperature.

It is an advantage of the process of the present invention that the solvent is continuously being purified of particulate matter such as soil, metal fines, etc., acids, oils and greases on each cycle of the solvent. It is a further advantage that heat economics are realized by employing the step of generating the requisite vapors required by the treatment simultaneous with the purification step. A further advantage of the present invention is that the inhibitors as well as other volatile components of the solvent can be vaporized along with the solvent thus maintaining their concentration in the vapor as well as in the liquid. These and other advantages which will be obvious to those skilled in the art are achieved by the employment of the apparatus described above.

DETAILED DESCRIPTION OF INVENTION

The following description is made with specific reference to the drawing:

One embodiment of the present invention comprises, as shown in FIG. 1, a generally rectangular box-shaped chamber (1) open at its top to the ambient atmosphere. Within said chamber near the open-top is located a series of tubes or pipe (2) which are designed to carry a cold fluid, such as water, and which serve as a vapor level control means. Directly below said tubes (2) positioned to collect condensate which forms on said tubes (2) is a collecting trough (3). Outside the boxlike chamber (1) juxtapositioned with relation to said tubes (2) and said collecting trough (3), is a single-pass conduit (4) which is designed in a manner such that one of its walls is the wall of the chamber through which a cooling medium can flow. This conduit is hereinafter referred to as a cold wall (4). Associated with said collecting trough (3) and provided with tubing or piping (5) defining a fluid path from said collecting trough (3) thereto is a water trap (6). The trap is provided with a valve (7) to enable withdrawal of water from the trap (6). Also provided from said trap (6) is a solvent overflow pipe (8) for delivering condensed solvent to the interior of said chamber (1). A removable screen (9) is provided in and near the bottom (10) of the chamber (1).

Associated with, as an integral part of the chamber (1), is a smaller boxlike structure (11). This second structure (11) is in fluid communication through an opening (12) in the sidewall (13) of said chamber (1). Within said second structure (11) is a diagonally positioned heat exchange surface (14). The highest end (15) of which is near the opening (12) through the wall (13) of said chamber (1). Near the lower end (16) of said heat exchange surface (14) is provided a liquid trap (17) through which high boiling contaminates can be removed from the structure (11).

In the embodiment shown in FIG. 1, a pump (18) is provided to withdraw liquid from the bottom (10) of chamber (1) and deliver it through piping (19) to the upper end (15) of the heat exchange surface (14).

In operation of the degreaser described above, a liquid solvent such as trichloroethylene is loaded into said chamber (1) until the liquid is at a convenient level lower than the opening (12) in the chamber wall (13) communicating with the boxlike structure (11). Cold water or similar fluid is fed to the tubing (2) and cold wall (4). Steam or other source of heat is introduced to said heat exchange surface (14) and the pump (18) activated. Solvent which is directed onto the heat exchange surface (14) is heated to its boiling temperature and vaporized. The so-vaporized solvent flows into the chamber (1) passing through the wall opening (12) and fills the chamber (1) with the hot vapors from the liquid bath to a level (20) at the vapor level control (condensing coils) (2). Solvent vapors are condensed on the coils (2), drop to the collecting trough (3) and flow into the water trap or separator (6). When the solvent in the water separator (6) reaches the overflow (8), solvent will return to the chamber (1) liquid bath. Once a vapor atmosphere is generated and fills the vapor zone (19), the apparatus is ready to receive material, for example, dirty, oily and greasy parts for cleaning. The cleaning is carried out in the well-known manner. The part being cold causes the solvent vapors to condense on its surfaces. The liquid solvent dissolves the grease and oil and washes away insoluble dirt. The part is, when its surface at least reaches the solvent vapor temperatures, at which time no more solvent vapor will condense thereon, removed from the vapor zone. Hoewever, the part may be actually dipped into the solvent bath below the vapor zone then brought up into the vapor zone until its temperature reaches the vapor temperature, then withdrawn. In either case, the part is removed free of grease, oils and dirt and free of solvent.

Figure 3:
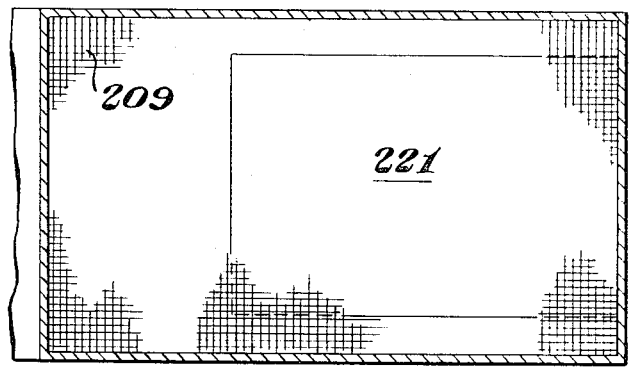
FIG. 3 illustrates a top view through section line 3—3 of FIG. 2 showing the configuration of the baffle to direct condensing fluids to the top end of the heat exchange surface and permit vapors to flow upward past the baffle.
Figure 2:
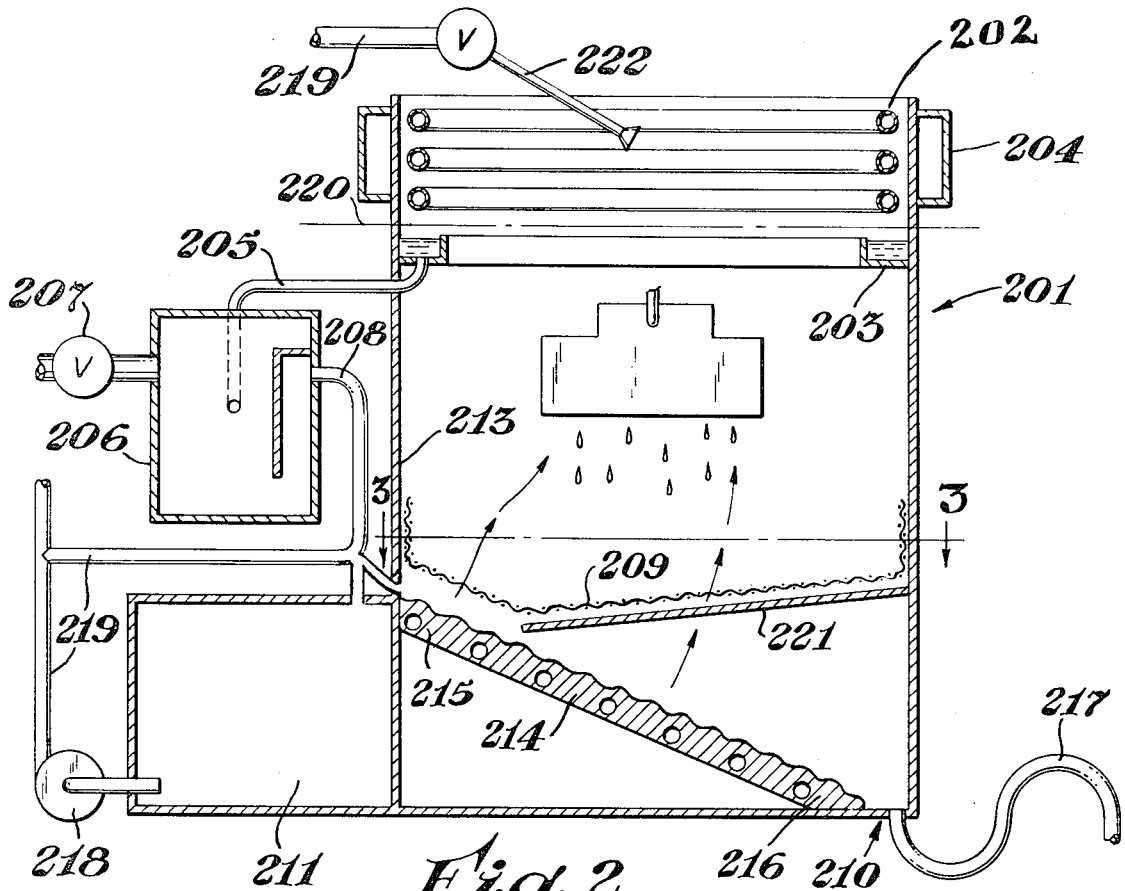
FIG. 2 illustrates sectional view of another form of an apparatus in which the heat exchange surface is within the receptacle proper but shielded from the falling condensate.

In another embodiment illustrated in FIGS. 2 and 3 a degreaser (201) similar to that shown in FIG. 1 is provided with the cooling coils (202), collecting trough (203), cold wall (204), water separator (206) and a heat exchange surface (202) located within the degreaser (201) proper. The heat exchange surface (214) is positioned in the bottom of the chamber (201) below the removable screen (209) and a baffle (221) covering the central portion of the heat exchange surface (214). The solvent storage (211) is exterior of the chamber (201) with a pump (218) delivering solvent to the heat exchange surface (214) through piping (219). Also illustrated with the particular embodiment is the common spray lance (222). This lance (222) can be supplied liquid solvent by the same pump (218) used to deliver solvent to the heat exchange surface (214). The water separator (206) returns the condensed solvent from the collecting trough (203) to the solvent storage (211). The operation of the embodiment shown in FIG. 2 is much the same as that first described in relation to operation of FIG. 1. The top view of the shield or baffle (221) is shown as FIG. 3 spaced from at least three walls to permit vapors to rise.

Figure 4:
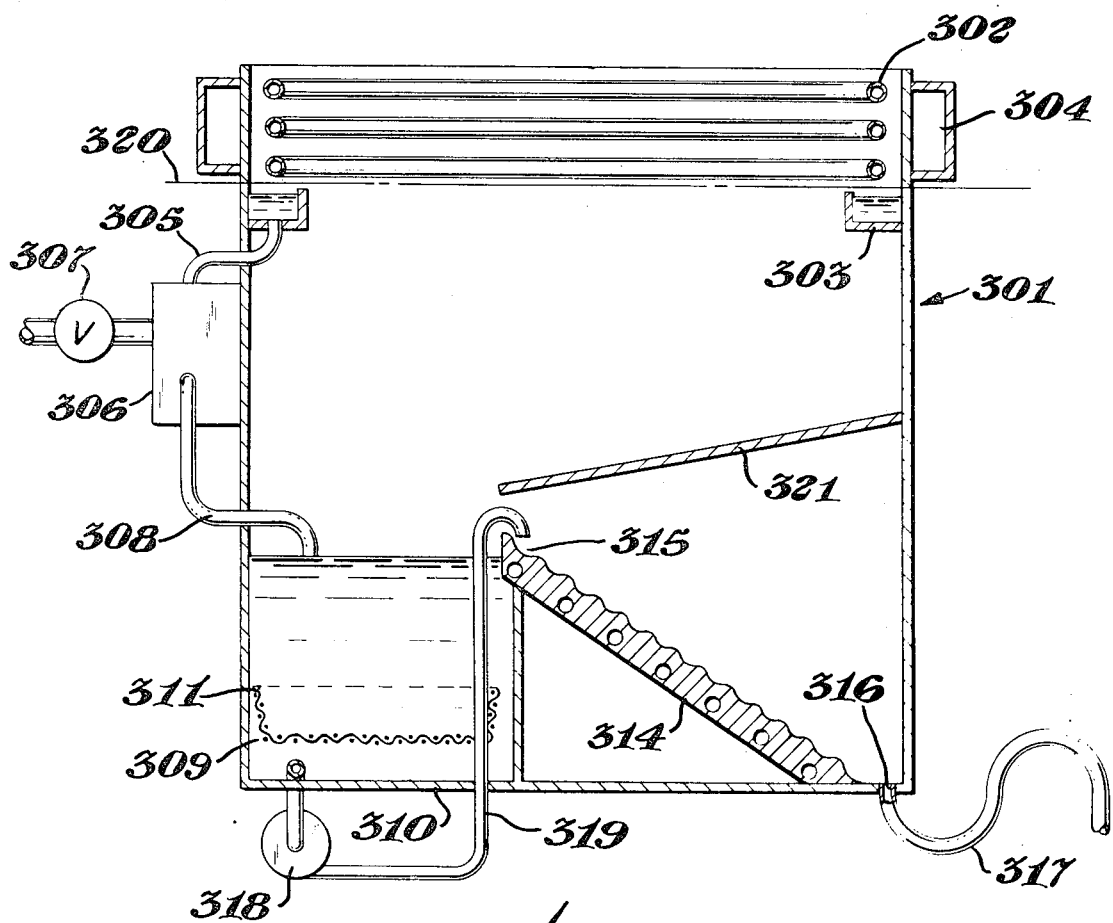
FIG. 4 illustrates a sectional view of another modification of an apparatus incorporating a warm dip section within the receptacle as well as the heat exchange surface.

A third embodiment of the present invention is illustrated in FIG. 4. The apparatus shown in FIG. 4 is a combination of the general designs of the apparatus shown in FIGS. 1 and 2. Reference numerals suffixed by the integer 3 refer to the same parts described with reference to FIG. 1.

Figure 5:
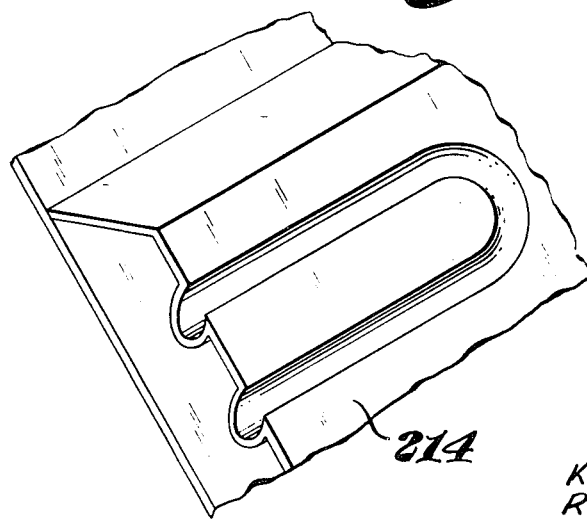
FIG. 5 illustrates a heat exchanger which can be used in place of the surface 14 in FIG. 1, 214 in FIG. 2 and 314 in FIG. 4.

FIG. 5 illustrates a design for the heat exchange surface (14, 214 or 314) of the apparatus shown in FIGS. 1, 2 and 4.

We claim:

1. An apparatus for generating solvent vapors which comprises a vapor confining zone open to the atmosphere,
a liquid confining zone being generally below said vapor zone,
a falling film heat exchange surface having heating means therein and being generally disposed from the vapor zone and in fluid communication with said zone,
said heat exchange surface being a roughened surface providing small pockets to provide a tortuous path for solvent passing thereover,
pump means to transport liquid from said liquid confining zone to said heat exchange surface,
said vapor confining zone being defined as to its upper extreme by a condenser,
a condensed liquid collecting trough disposed below said condenser,
means to remove fluid from said collecting trough and return the same to the liquid confining zone,
means to remove entrained water from the solvent prior to return to said liquid zone.

2. An apparatus for generating solvent vapors which comprises a receptacle provided with a means of ingress and egress between its interior and the ambient atmosphere;
said receptacle having a first zone in its lower extreme for storing a liquid solvent and roughened falling film heat exchange surface having heating means therein;
said receptacle having a second zone immediately thereabove for containing vapors of said liquid solvent;
a plate above said heat exchange surface positioned to direct liquid to the upper extreme of said surface and/or into said storage,
said second zone being provided with vapor level control means and liquid solvent return means;
said first zone being provided with liquid delivery means to the upper extreme of said heat-exchange surface;
means for withdrawing nonvolatile matter from the lower extreme of said heat exchange surface.

* * * * *